(12) United States Patent
Haupt

(10) Patent No.: US 7,311,463 B2
(45) Date of Patent: Dec. 25, 2007

(54) ARRANGEMENT FOR SECURING A SNAP RING

(75) Inventor: Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 169 days.

(21) Appl. No.: 10/542,716

(22) PCT Filed: Jan. 16, 2004

(86) PCT No.: PCT/EP2004/000296

§ 371 (c)(1),
(2), (4) Date: Sep. 21, 2005

(87) PCT Pub. No.: WO2004/065809

PCT Pub. Date: Aug. 5, 2004

(65) Prior Publication Data

US 2006/0130295 A1   Jun. 22, 2006

(30) Foreign Application Priority Data

Jan. 21, 2003   (DE) ................ 103 02 075

(51) Int. Cl.
*F16B 7/04* (2006.01)
(52) U.S. Cl. .............. 403/372; 403/204; 403/316; 403/332; 411/518; 192/70.2
(58) Field of Classification Search ............. 403/202, 403/203, 204, 315, 316, 317, 332, 365, 376, 403/372; 192/70.2; 411/353, 517, 518, 411/519
See application file for complete search history.

(56) References Cited

U.S. PATENT DOCUMENTS

| 2,896,287 | A | * | 7/1959 | Stultz | 411/521 |
|---|---|---|---|---|---|
| 2,919,736 | A | * | 1/1960 | Kann | 411/353 |
| 3,070,389 | A | * | 12/1962 | Baur et al. | 403/317 |
| 3,535,977 | A | | 10/1970 | Baumgarten | |
| 3,827,814 | A | | 8/1974 | Laurent et al. | |
| 3,924,957 | A | | 12/1975 | Camosso | |
| 4,018,318 | A | | 4/1977 | Hallerberg | |
| 4,261,668 | A | | 4/1981 | Rigal | |
| 4,757,887 | A | | 7/1988 | Ostrander et al. | |
| 4,798,548 | A | * | 1/1989 | Higby et al. | 411/518 |

FOREIGN PATENT DOCUMENTS

| DE | 71 21 816 U1 | 9/1971 |
|---|---|---|
| DE | 2 427 006 | 12/1974 |
| DE | 75 35 901 U1 | 4/1976 |
| DE | 25 08 677 | 9/1976 |
| EP | 0 415 027 A1 | 3/1991 |
| GB | 1 477 831 | 6/1977 |
| GB | 1 529 015 | 10/1978 |
| JP | 54123643 | 9/1979 |

* cited by examiner

*Primary Examiner*—Daniel P. Stodola
*Assistant Examiner*—Michael P. Ferguson
(74) *Attorney, Agent, or Firm*—Davis Bujold & Daniels, P.L.L.C.

(57) ABSTRACT

An arrangement for axially supporting two jointly rotating components (2, 3) by way of a snap ring (6) having two displaceable impacting ends (6a, 6b), which are separated from each other by a peripheral gap (7), and which can move in the region of a radial spring path. The snap ring (6) is inserted into an annular groove of the supporting component (2). The supporting component (3) comprises one ramp (8, 9) in the region of the radial spring path of the impacting ends (6a, 6b) of the snap ring (6).

9 Claims, 5 Drawing Sheets

Fig. 7
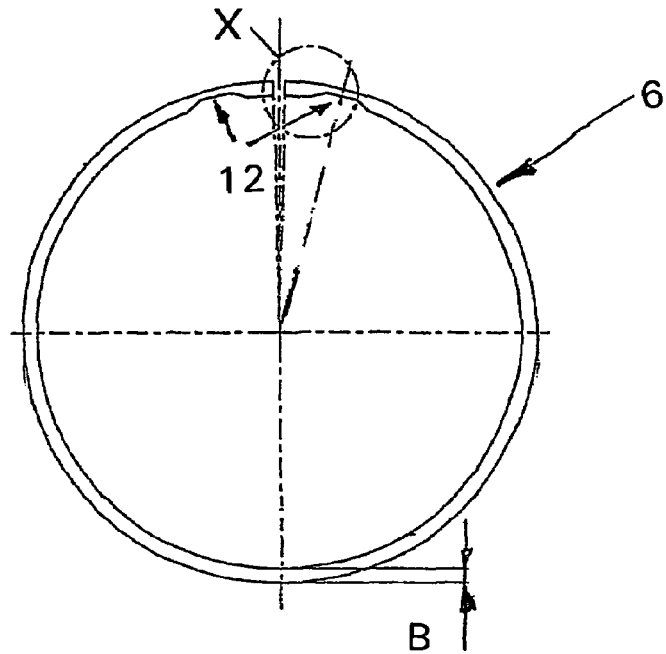
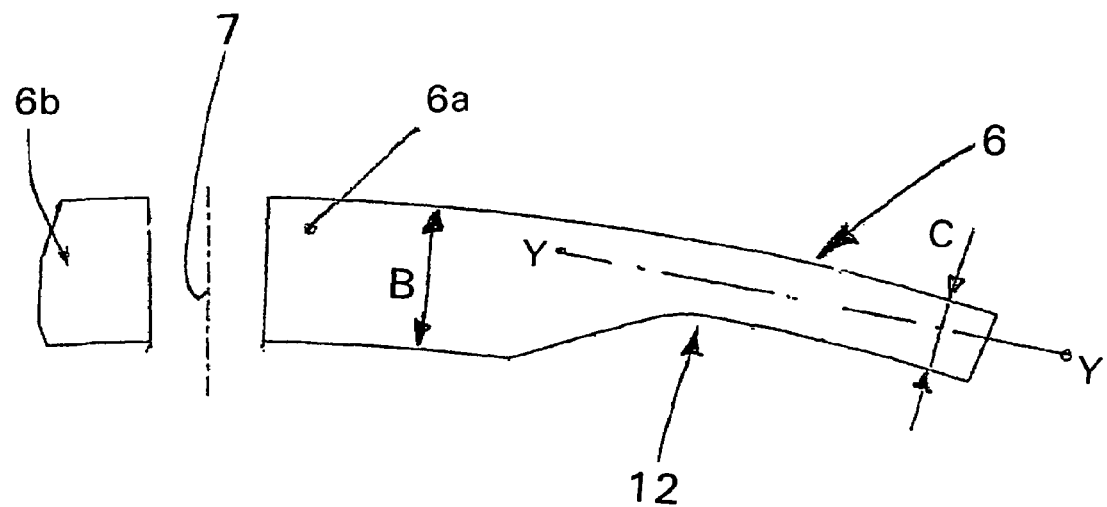
Fig. 8

US 7,311,463 B2

ARRANGEMENT FOR SECURING A SNAP RING

This application is a national stage completion of PCT/EP2004/000296 filed Jan. 16, 2004 which claims priority from German Application Serial No. 103 02 075.6 filed Jan. 21, 2003.

FIELD OF THE INVENTION

The invention relates to an arrangement for axial support of two jointly rotating components by means of a snap ring.

BACKGROUND OF THE INVENTION

The axial support by way of a snap ring of components, for example, of a ball bearing or a gear wheel, jointly rotating upon a shaft, is already known. The snap ring is not closed, but has a gap extending in peripheral direction and, therefore, its outer or inner diameter can be changed by elastic deformation. The snap ring is held on the shaft in a narrowly tolerated annular groove. The snap ring can also be inserted in an annular groove of a hollow part such as a hole. The snap ring is conventionally secured on its groove only by its tension. Under certain operating conditions, like high peripheral speeds associated with vibrations, said spring tension does not suffice to keep the snap ring in its groove. On the contrary, it can happen that the snap ring emerges from its groove and thus can no longer fulfill its function of axial fixing function. This can result in sensitive damages.

The object of this invention is, therefore, to provide for an arrangement of the above mentioned kind of snap ring securing device which prevents the snap ring from leaving its annular groove with no further added expenses resulting.

According to the invention, ramps are provided in the area of the impacting ends which prevent the snap ring from springing in or out in the area. The impacting ends are thus secured with a positive fit against radial movements. Depending on whether the snap ring is situated in a hole or on a shaft, the ramps are disposed either radially within or radially without the impacting ends.

SUMMARY OF THE INVENTION

With each impacting end, a single ramp is coordinated, which presents a springing in or out of each impacting end in radial direction. Between the two impacting ends, it is advantageous to situate one stop in the peripheral gap which presents a twisting of the snap ring. Thereby the impacting ends of the snap ring are kept in the sphere of action of the ramps and the snap ring can no longer spontaneously leave the annular groove. The stop between the two impacting ends can be advantageously designed as knubs. Knubs and ramps have an axial extension in the area of the axial thickness of the snap ring, preferably somewhat smaller. It is further advantageous that the components be designed as sheet metal components and the ramps and/or the knubs be stamped from the sheet metal component or components. Such a stamping is practically neutral in cost, since the stamping tool concerned requires only a small change. It is further advantageous that the ends of the snap ring be designed before the impacting ends non-torsionally around an axis extending in peripheral direction. This is of advantage in the assembling of the snap rings mounted in the annular groove since the snap ring ends slide over the ramps during the assembly becoming axially twisted and finally snap in or lock behind the ramps. It is an advantage of the snap ring if per se too non-torsional to reduce the cross-section in radial direction. By way of this simple step, the desired torsional stiffness is obtained in the area of the impacting ends. Finally, it is advantageous that the supported and/or to be supported sheet metal components are parts of a multi-disc clutch, that is, disc carriers. Snap rings are used under extremely limited installation conditions for axial fixing of a disc set under axial pressure and are also, at the same time, subjected to vibration stresses. The inventive securing of the snap ring by way of ramps and knubs is of particular advantage in this embodiment of a multi-disc clutch.

BRIEF DESCRIPTION OF THE DRAWINGS

The invention will now be described, by way of example, with reference to the accompanying drawings in which:

FIG. 7 is a snap ring; and

FIG. 8 is a detail X from FIG. 7.

DETAILED DESCRIPTION OF THE INVENTION

Figure 1:
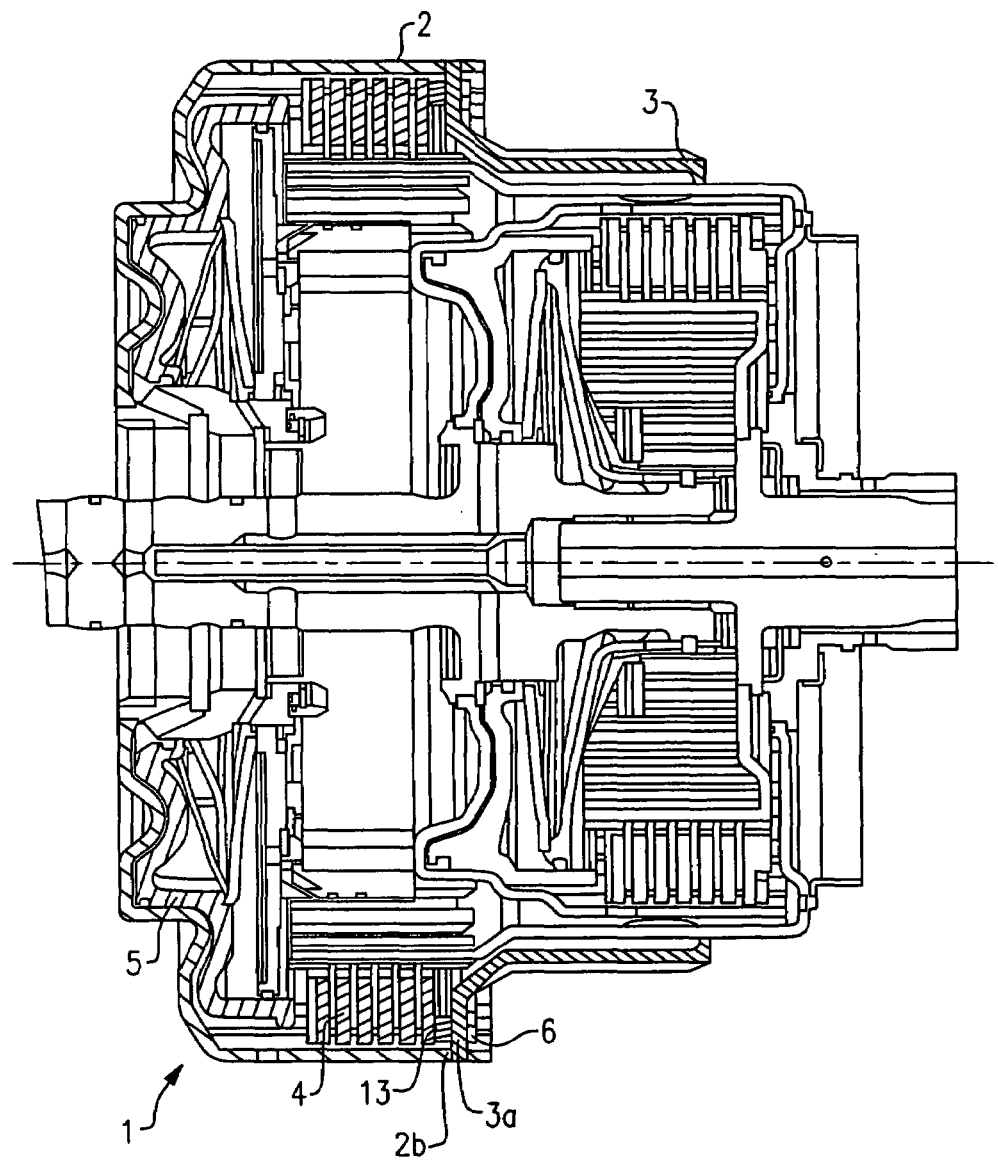
FIG. 1 is an axial section through a multi-disc clutch of a motor vehicle transmission.

FIG. 1 shows a multi-disc clutch 1, that is, a shifting element of an automatic transmission for a motor vehicle. The multi-disc clutch 1 has one outer disc carrier 2 and one inner disc carrier 3, which is non-rotatably connected with the outer disc carrier 2. Within the outer disc carrier 2 is situated one disc set 4 which is pressed against a snap ring 13 by a hydraulically actuatable gearshift piston 5.

The snap ring 13 is held in an annular groove of the outer disc carrier 2 and dimensioned so as to need no additional securing. The inner disc carrier 3 has one front flange 3a which is situated directly adjacent the snap ring 13, but without contact, and is fixed axially in one direction by a secured snap ring 6. In the opposite direction, the front flange 3a abuts preferably on three front surface areas 2b of the outer disc carrier 2. The snap ring 6—contrary to the snap ring 13—is of lesser dimensions for reasons of space and function and, to that extent, is in danger of coming out. Therefore, it has a securing device described below.

Figure 2:
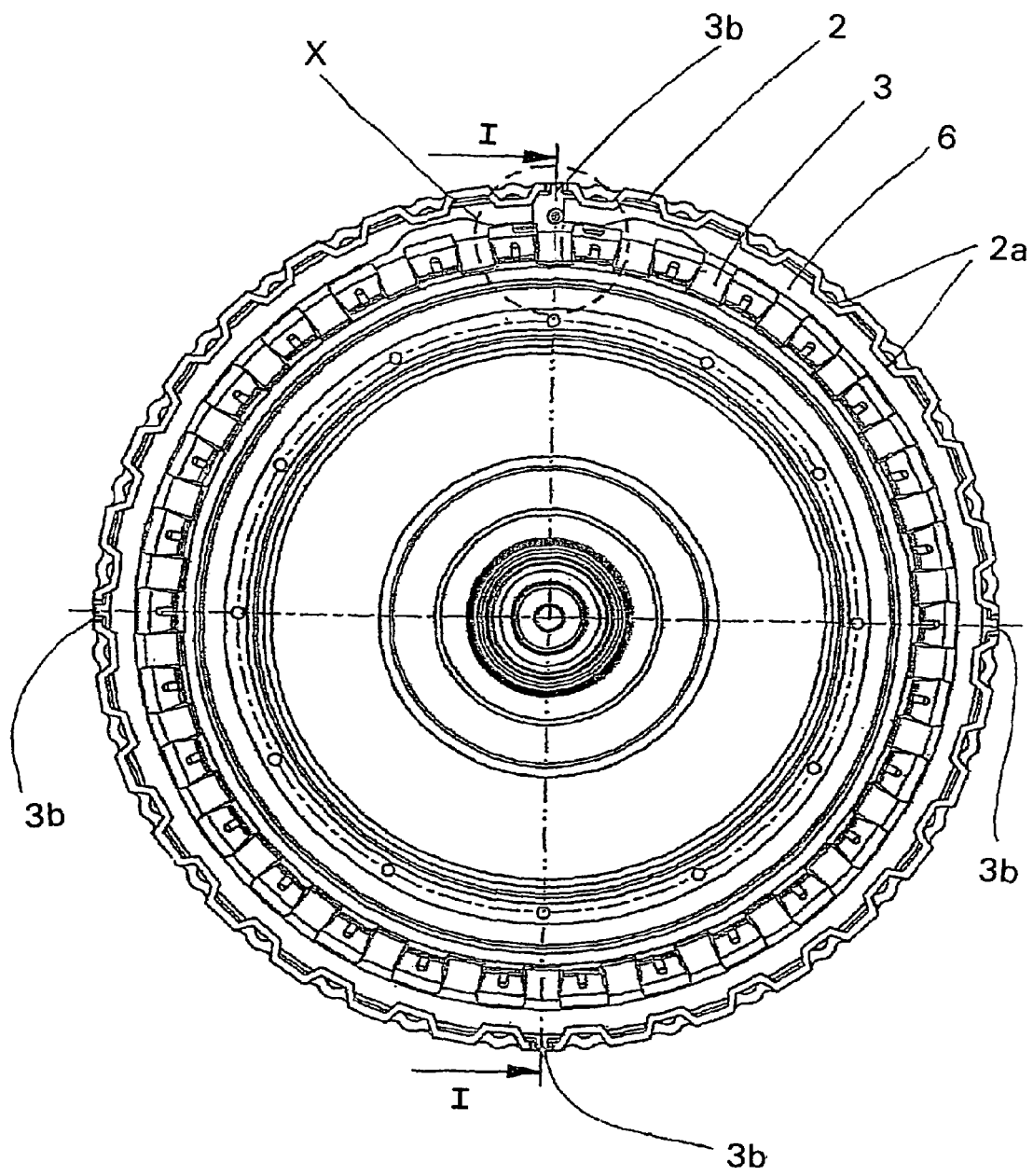
FIG. 2 is a view in axial direction on the multi-disc clutch according to FIG. 1.

FIG. 2 shows a view in axial direction on the inner disc carrier 3 and the snap ring 6 which is overlapped by the outer disc carrier 2 by trapezoidally designed crimpings 2a (disc toothing of the outer disc carrier 2). The inner disc carrier 3 is secured opposite the outer disc carrier 2 via radial projections 3b axially in one direction and by the snap ring 6 in the other direction. In the area X, surrounded by a dotted line, the snap ring 6 is split (as shown as detail X in perspective representation in FIG. 3) and only for the part 3 in FIGS. 5 and 6.

Figure 3:
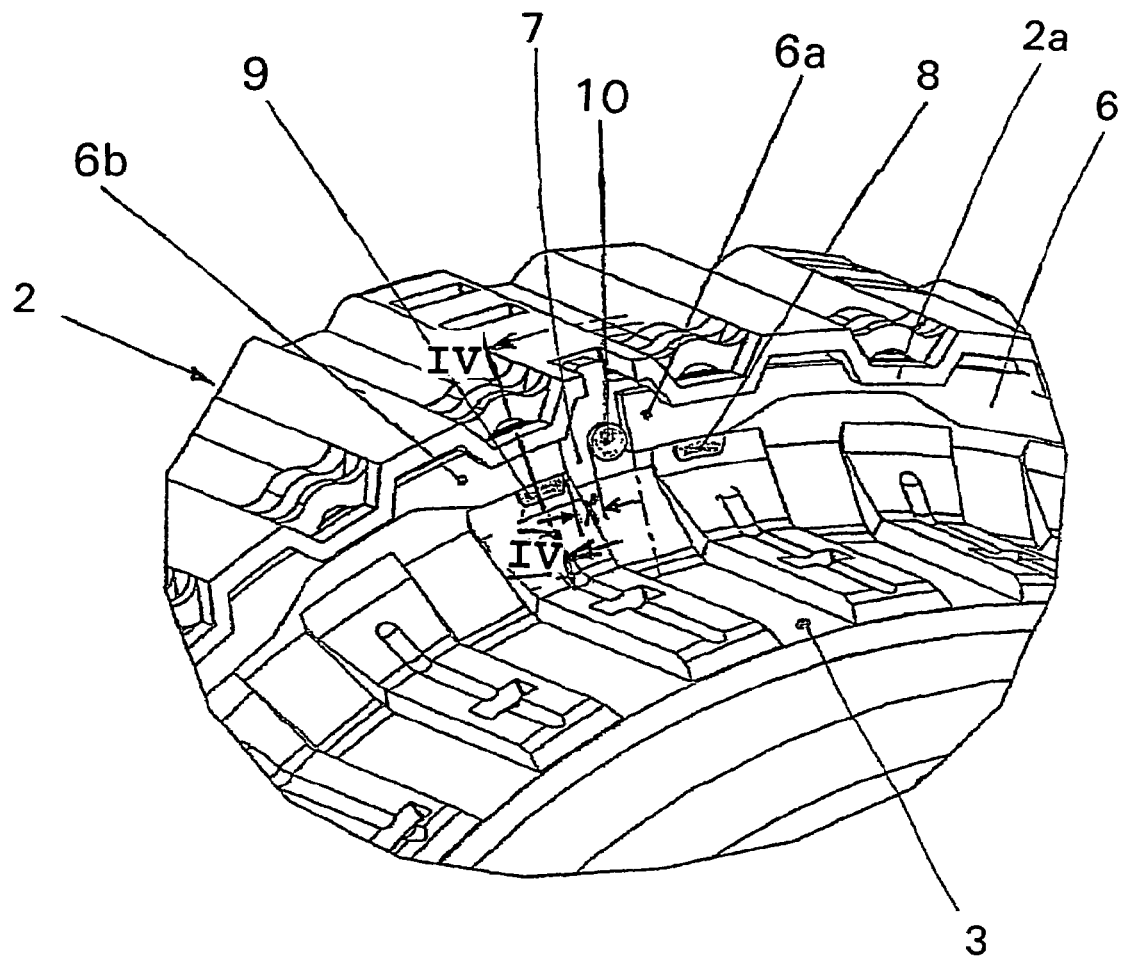
FIG. 3 is a partial view in perspective of a snap ring securing device.

In a perspective representation, FIG. 3 shows one section in the area of the detail X of FIG. 2. The snap ring 6 has two impacting ends 6a, 6b between which extends a peripheral gap 7. The snap ring 6 is overlapped by the radial crimpings 2a and held in axial direction. Radially within the impacting ends 6a, 6b so-called support ramps 8, 9 are situated upon the inner disc carrier 3. In the area of the peripheral gap 7, a knub 10 of approximately circular design is situated on which abuts the impacting end 6a. A peripheral gap x remains between the non-abutting side of the knub 10 and the other impacting end 6b.

Figure 4:
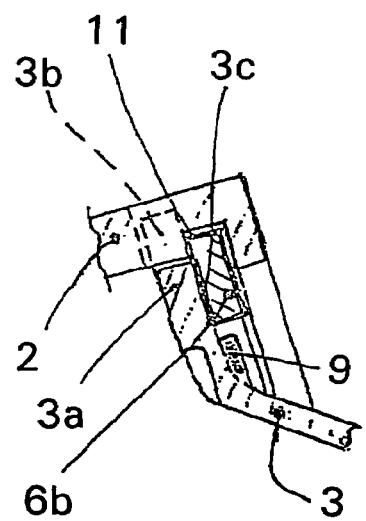
FIG. 4 is a simplified transverse section along the line IV-IV in FIG. 3.

FIG. 4 shows a simplified partial section along the line IV-IV in FIG. 3, that is, radially situated within the impacting end 6b through the impacting end 6b and the ramp 9. The ramp 9 forms an interruption and is stamped from the inner disc carrier 3 designed as a sheet metal part that is integral therewith. In the outer disc carrier 2, an annular groove 11 is located in which is inserted and axially fixed the snap ring 6 with its impacting ends 6a, 6b. Against the area of the snap ring 6 or 6b radially projecting inwardly from the annular groove 11, the front flange 3a leans with a front face 3c so that the inner disc carrier 3 is supported in axial direction.

Figure 5:
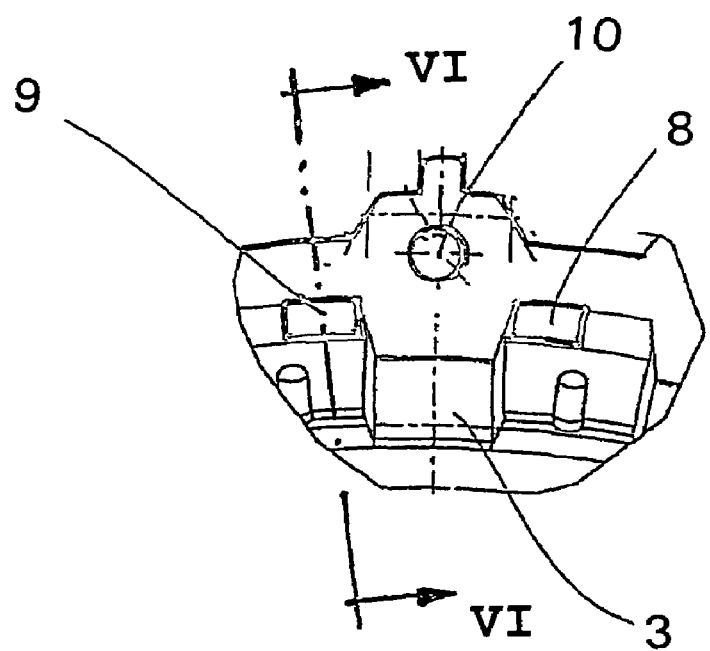
FIG. 5 is a partial view on the component to be supported with a snap ring securing device.

FIG. 5 shows a partial view of the inner disc carrier 3 in the area of the detail X in FIG. 2, that is, the approximately rectangularly designed ramps 8, 9 and the knubs 10 situated between the ramps but radially somewhat outside.

Figure 6:
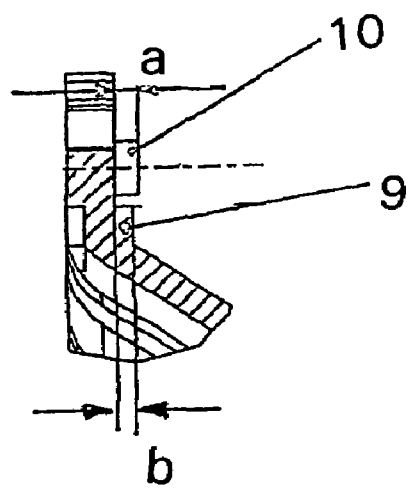
FIG. 6 is a section along line VI-VI in FIG. 5.

FIG. 6 shows a section along the line VI-VI in FIG. 5 wherein the splines of the ramp 9 and of the knub 10 can be seen. The axial extension a of knubs 10 and the axial depth b of the ramp 9 or 8 are in the area of the axial extension of the snap ring 6. The knub 10 is also stamped from the sheet metal component 3. To that extent, both the ramps 8, 9 and the knubs 10 can be produced easily and without added working operation integral with the disc carrier 3. The axial depth a of ramps 8, 9 and the axial depth b of the knubs 10 are preferably smaller than that of the snap ring 6.

FIG. 7 shows the snap ring 6 as a separate component. Its radial extension is designated with B. The snap ring has throughout its periphery this dimension B—with the exception of two recesses 12, which are situated in the area of the peripheral gap 7 and of the impacting ends 6a, 6b.

FIG. 8 shows a detail X in the area of the peripheral gap 7 and of the recess 12 of FIG. 7. Both impacting ends 6a, 6b form the peripheral gap 7 between them. The impacting ends 6a, 6b have the dimension B in the area of the peripheral gap. On the impacting end 6a, on the side remote from the gap 7, a recess 12 attaches itself, which results in a reduction of the height of the snap ring designed with C. In the area of this reduced cross-section is plotted a somewhat tangentially extending axis Y-Y which forms the torsion axis of the snap ring 6 in this area.

The function of the snap ring 6 is explained as follows: the snap ring 6 is first mounted, that is, threaded in the annular groove 11 (FIG. 4). This takes place approximately up to the position shown in FIG. 3, that is, the impacting end 6b lies approximately flush with the ramp 9. The other impacting end 6a obviously is not met in the annular groove, but somewhat radially within, that is, seen in axial direction before the ramp 8; the cross-section of the snap ring being axially twisted. In the embodiments according to FIG. 8, this means that the impacting end 6a is axially twisted around the torsion axis Y-Y opposite the cross-section designated with C. Accordingly, in order to adapt the torsional forces or torsional torques that appear, the snap ring cross-section has become correspondingly reduced (the snap ring cross-section thereby became torsion weaker) in the embodiment according to FIG. 8. In order finally to bring the axially twisted impacting end 6a to its position in the annular groove 11, it is pressed radially outwardly rebounding to its axial twisting, according to FIG. 4, and is thus simultaneously snapped behind the ramp 8. The radially inwardly springing out from the groove 11 is now blocked by the two ramps 8, 9. In order that the snap ring 6 does not move in peripheral direction ad the impacting ends 6a, 6b would possibly be offset opposite the ramps 8, 9, the knubs 10 are placed in the area of the peripheral gap 7 or between the ramps 8, 9. Only a small peripheral play x (FIG. 3) is thus possible, but it is selected so that the ramps 8, 9 lie always within the impacting ends 6a, 6b.

The invention has been explained above with reference to one embodiment, namely, a multi-disc clutch with an outer and an inner disc carrier, that is, with a snap ring, which is located in a hole or a hollow cylindrical component. But it is also within the scope of the invention to mount the snap ring upon a shaft or upon the outer surface of a cylindrical component. In this case, the ramps would have to be disposed radially outside the snap ring to prevent the impacting ends from radially springing out.

REFERENCE NUMERALS 1 multi-disc clutch
2 outer disc carrier
2a crimping (disc toothing)
2b front face area
3 inner disc carrier
3a front flange
3b radial projection
3c front face
4 disc set
5 shift piston
6 snap ring (secured)
6a impacting end
6b impacting end
7 peripheral gap
8 ramp
9 ramp
10 knubs
11 annular groove
12 recess
13 snap ring (not secured)

What is claimed is:

1. An arrangement axially supporting of a supporting component (2) and a supported component (3), jointly rotating with the supporting component (2), the supporting and the supported components (2, 3) being components of a clutch disk carrier and the arrangement comprising:

a supported component concentrically mounted within a cavity defined by a peripheral wall of the supporting component, a snap ring (6) having two impacting ends (6a, 6b) separated by a peripheral gap (7), wherein the snap ring (6) is resiliently twistable within of a radial spring path and is inserted in an annular groove (11) within the cavity of the supporting component (2) for axially retaining the supported component within the supporting component, the supported component (3) having two ramps (8, 9) in an area of the radial spring path of the impacting ends (6a, 6b) of the snap ring (6), the two ramps (8, 9) being integrally formed with the supported component (3), one ramp (8, 9) being radially coordinated with each of the impacting ends (6a, 6b) of the snap ring (6) such that the ramps (8, 9) are being arranged on a diameter that is smaller than a diameter of the impacting ends (6a, 6b) for retaining the snap ring within the annular groove, a stop (10) being integrally formed with the supported component (3) and being located between the impacting ends (6a, 6b) within the peripheral gap (7) for preventing twisting of and removal of the snap ring from the annular groove.

2. The arrangement according to claim 1, wherein the stop is a knub (10) and situated upon the supported component (3).

3. The arrangement according to claim 1, wherein the supported component is a sheet metal component (3).

4. The arrangement according to claim 3, wherein the two ramps (8, 9) are stamped from the sheet metal supported component (3).

5. The arrangement according to claim 3, wherein the knub (10) is stamped from the sheet metal supported component (3).

6. The arrangement according to claim 3, wherein the supporting component is an outer (2) disc carrier and the supported component is an inner (3) disc carrier of a multi-disc clutch (1).

7. The arrangement according to claim 1, wherein the supporting component is a sheet metal component (2).

8. The arrangement according to claim 1, wherein a cross section dimension of the snap ring (6) is reduced in at least one peripheral area adjacent at least one of the impacting ends (6a, 6b) to determine a reduced torsional force required for resiliently twisting the snap ring (6) about a circumferential axis of the snap ring (6) in the peripheral gap adjacent the at least one of the impacting ends (6a, 6b) when engaging the snap ring (6) in the annular groove (11), the snap ring (6) resiliently reverting to an untwisted shape after engagement when engaged with the annular groove (11).

9. An arrangement axially supporting two jointly rotating components (2, 3) of a clutch disk carrier comprising:
   a supporting component,
   a supported component concentrically mounted within a cavity defined by a peripheral wall of the supporting component,
   a snap ring (6) having two impacting ends (6a, 6b) separated by a peripheral gap (7),
   wherein the snap ring (6) is resiliently twistable within a radial spring path and inserted in an annular groove (11) within the cavity of the supporting component (2) for axially retaining the supported component within the supporting component;
   the supporting component (2) having crimpings (2a) which project radially to form the annular groove (11);
   the supported component (3) having two ramps (8, 9) in the area of the radial spring path of the impacting ends (6a, 6b) of the snap ring (6) and a front flange (3a) projecting radially therefrom and inclined axially toward the crimpings (2a) of the supporting component (2); and
   one ramp (8, 9) being radially coordinated with each of the impacting ends (6a, 6b) of the snap ring (6) such that the ramps are arranged on a diameter that is smaller than a diameter of the impacting ends for retaining the snap ring within the annular groove, and the two impacting ends (6a, 6b) are placed on a front face (3c) of the front flange (3a) within the annular groove so that the supported component (3) is retained in an axial direction within the supporting component.

* * * * *